United States Patent [19]
Stirland

[11] 3,905,253
[45] Sept. 16, 1975

[54] TRANSMISSION ASSEMBLY

[76] Inventor: Harry Stirland, Birch House, Victoria St., Gedling, England

[22] Filed: Apr. 10, 1973

[21] Appl. No.: 349,753

[30] Foreign Application Priority Data
Apr. 13, 1972 United Kingdom............. 17036/72

[52] U.S. Cl. ...................... 74/803; 74/801; 74/797
[51] Int. Cl. ............................................. F16h 1/28
[58] Field of Search.......... 74/789, 750 R, 640, 660, 74/679, 681, 701, 705, 797, 74,802, 803, 804, 805

[56] References Cited
UNITED STATES PATENTS

| | | | |
|---|---|---|---|
| 2,198,826 | 4/1940 | Lansing et al. | 74/803 |
| 2,231,784 | 2/1941 | Von Thungen | 74/802 |
| 2,374,718 | 5/1945 | Andrew | 74/802 |
| 2,520,282 | 8/1950 | Henry | 74/804 |
| 2,932,992 | 4/1960 | Larsh | 74/804 |
| 3,056,315 | 10/1962 | Mros | 74/805 |
| 3,143,899 | 8/1964 | York | 74/802 X |
| 3,430,523 | 3/1969 | Merritt | 74/805 |
| 3,448,638 | 6/1969 | Zahlaus | 74/804 |
| 3,596,538 | 8/1971 | Braun | 74/803 X |
| 3,646,834 | 3/1972 | Davis | 74/803 X |

FOREIGN PATENTS OR APPLICATIONS

| | | | |
|---|---|---|---|
| 1,105,191 | 11/1955 | France | 74/789 |
| 32,749 | 1/1924 | Denmark | 74/803 |

*Primary Examiner*—Samuel Scott
*Assistant Examiner*—Lance W. Chandler
*Attorney, Agent, or Firm*—Paul & Paul

[57] ABSTRACT

A transmission assembly having an input shaft and a take-off shaft rotatably journalled in a transmission element. The transmission element is conveniently the casing of the transmission assembly. A gearing arrangement is rotatably journalled in the transmission element and serves to connect the input and take-off shafts. In the preferred embodiment, the gearing arrangement comprises four gears, one keyed to the input shaft, one keyed to the take-off shaft, an idler gear journalled in the transmission element and in mesh with the gear associated with the input shaft, the idler gear being also in mesh with a pick-up gear also journalled in the transmission element and also in mesh with the gear associated with the take-off shaft.

When the input shaft is rotated and there is no restraint on the transmission element, the latter begins to rotate in the same direction as the input shaft. Should restraint now be applied to the transmission element, the take-off shaft is induced to rotate, the torque being developed in the take-off shaft being greater the faster the rotation of the transmission element. If the transmission element is locked into a non rotatable condition a condition of direct drive prevails.

6 Claims, 7 Drawing Figures

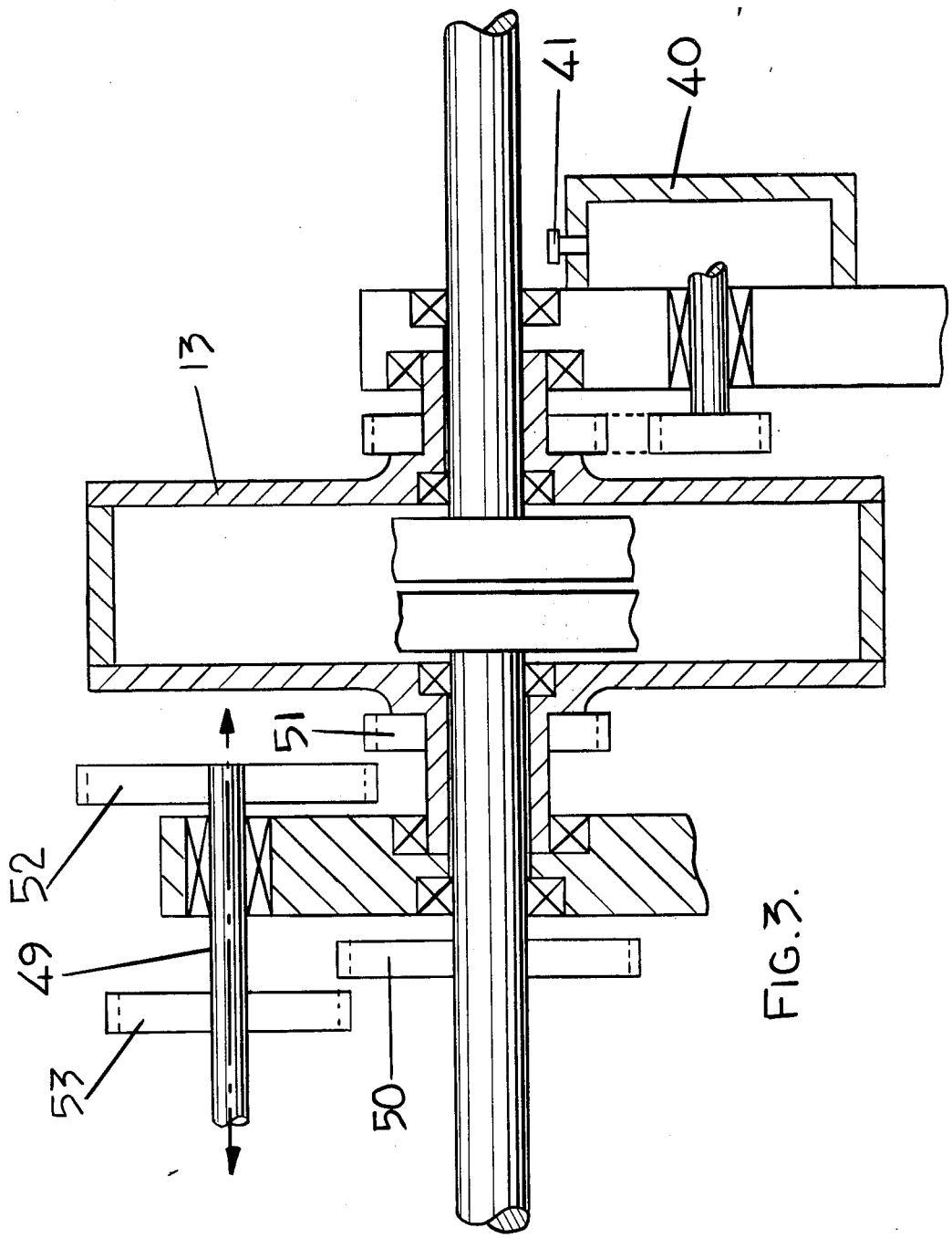

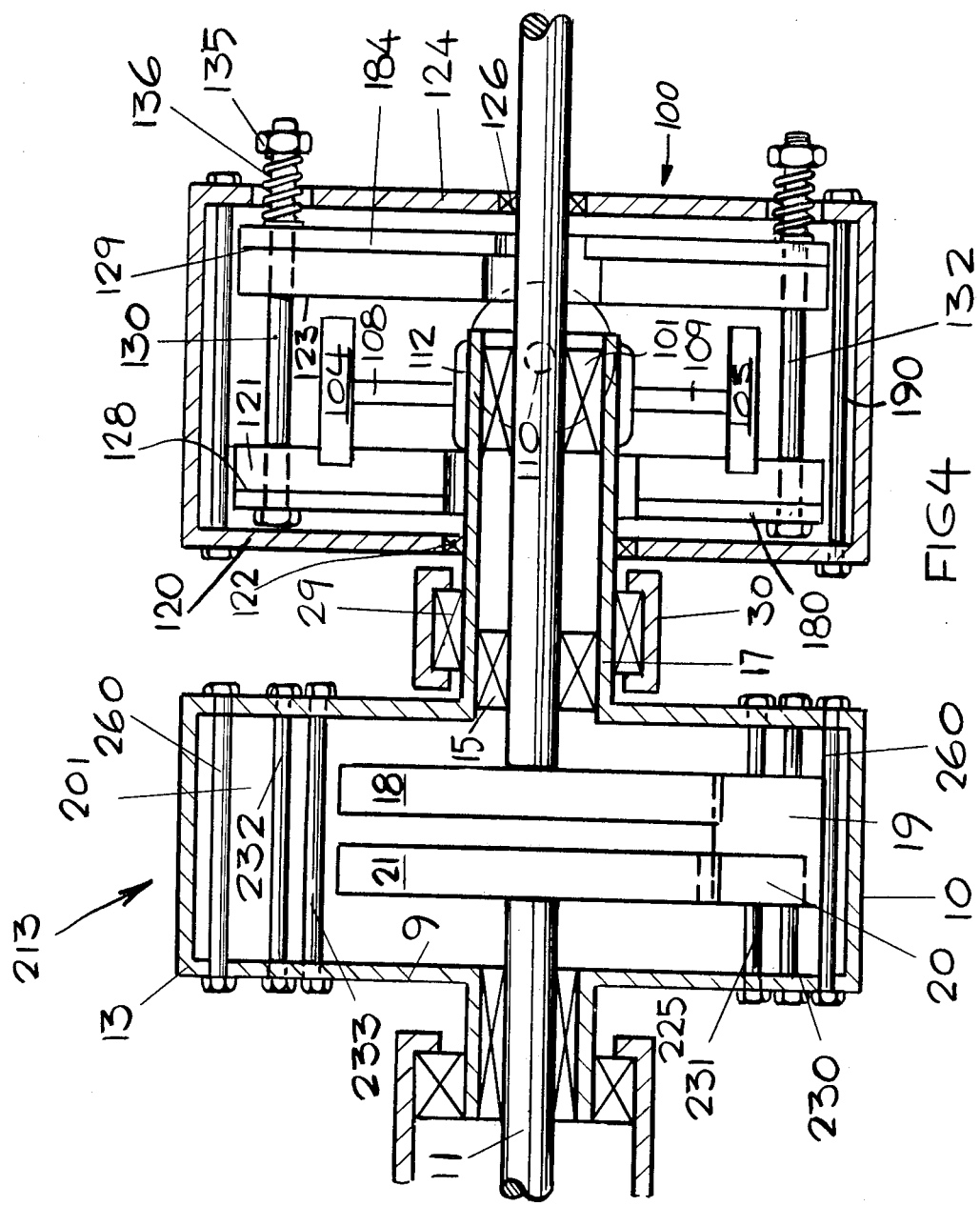

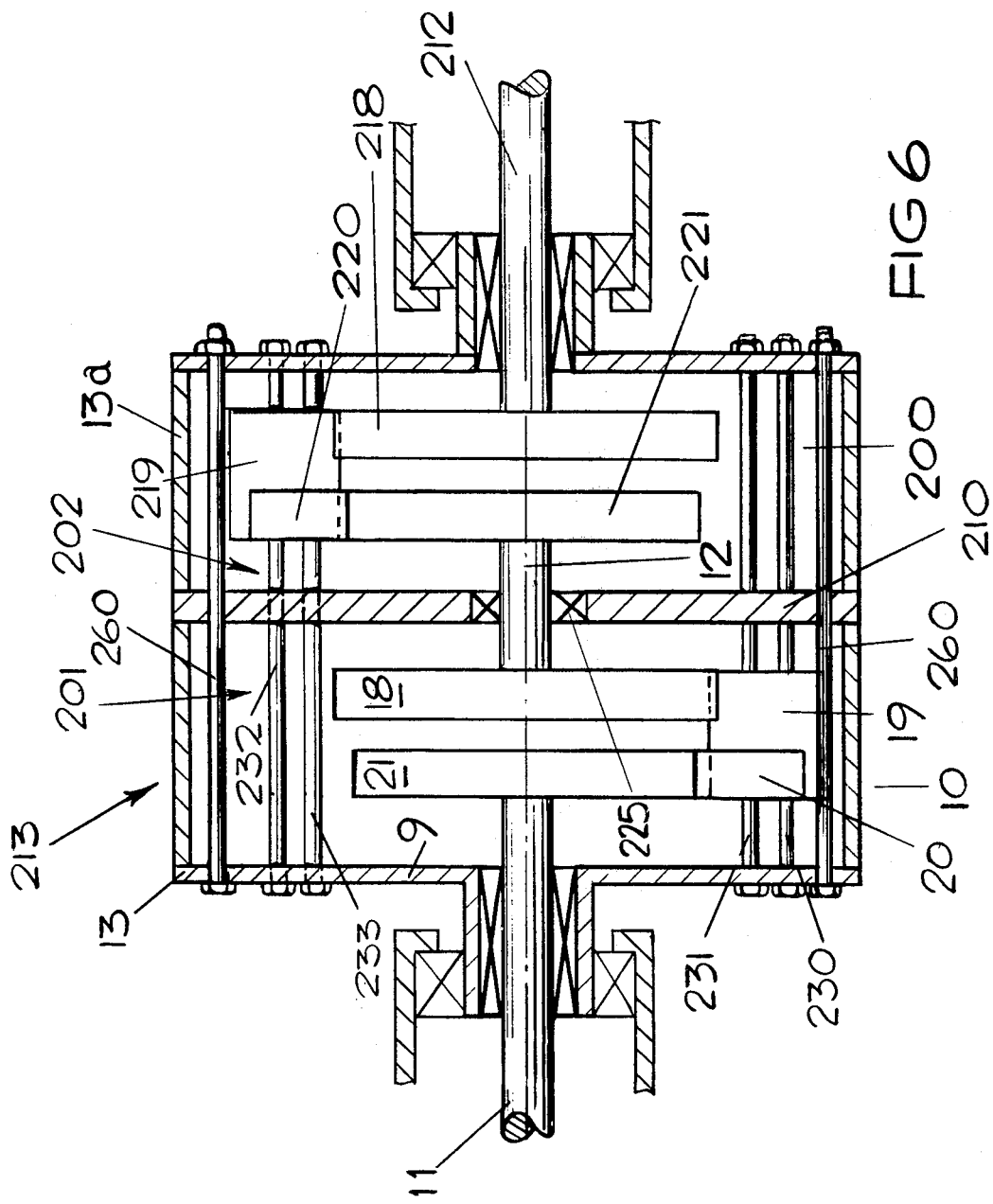

TRANSMISSION ASSEMBLY

BACKGROUND OF INVENTION

The present invention is concerned with transmission assemblies and more particularly with transmission assemblies which provide infinitely variable gear ratios between certain limits, for instance when in use with an engine or motor from a condition of neutrality to a condition of direct drive.

Conventional transmission assemblies are usually complicated in design and construction and are thus expensive to produce. Furthermore, such assemblies are usually large in size and also very heavy; these factors being disadvantageous when such an assembly is to be incorporated in a vehicle.

In accordance with the present invention there is provided a transmission assembly having a transmission element rotatably mounted in a support, an input shaft rotatably journalled in the transmission element, a take-off shaft rotatably journalled in the transmission element, a gearing arrangement journalled in the transmission element and connected between said input shaft and said take-off shaft and means for controlling the rate of rotation of the transmission element so as to regulate the speed of rotation of the take-off shaft.

In this specification "gearing arrangement" is used to include transmission member other than tooth members, e.g. frictionably engaged members.

It is an object of the present invention to provide a transmission assembly which is of simple construction and which is compact.

It is another object of the present invention to provide a transmission assembly which is capable of automatically varying the torque in the take-off shaft so as not to overload the input shaft by providing control means which permit the transmission element to rotate under a predetermined load.

BRIEF DESCRIPTION OF THE DRAWINGS

FIG. 3 is a sectional view of a transmission assembly according to the present invention including a reversing mechanism and, means for controlling the rate of rotation of the casing.

FIG. 4 is a sectional elevational view of a further embodiment of the present invention.

FIG. 6 is a sectional elevational view of a further embodiment of the present invention.

DETAILED DESCRIPTION OF THE PREFERRED EMBODIMENTS

Figure 1:
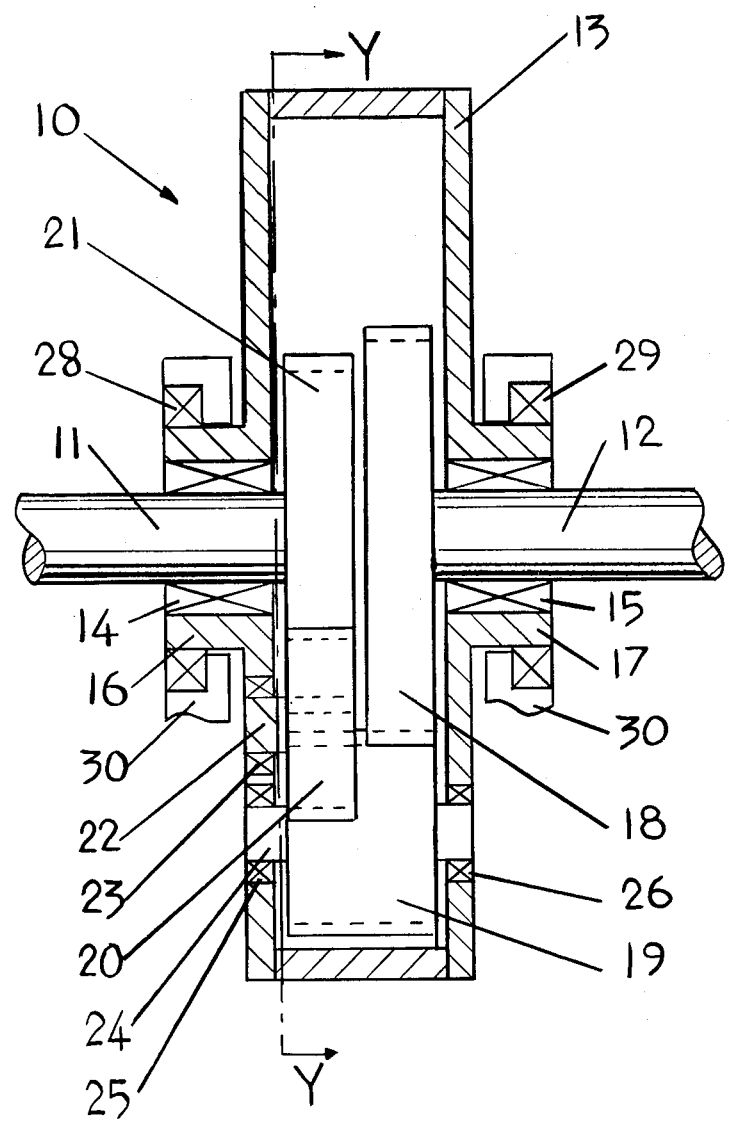
FIG. 1 is a sectional view of the embodiment taken along line X—X of FIG. 2.
Figure 2:
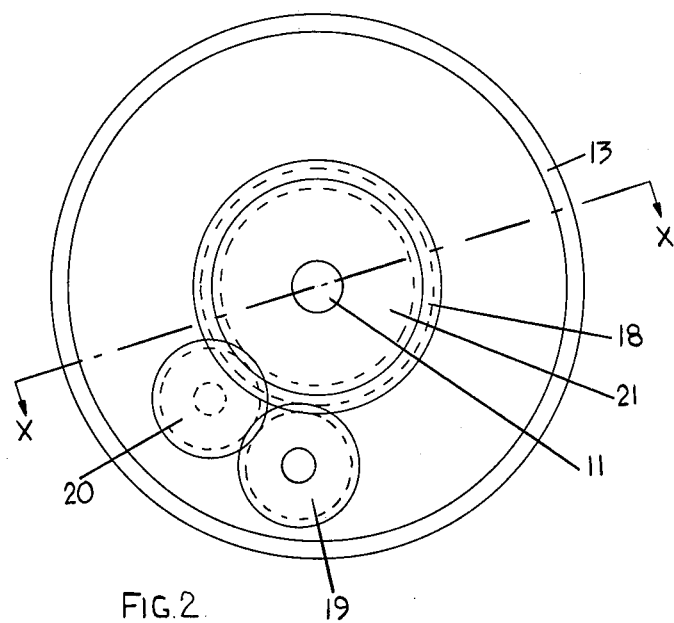
FIG. 2 is a partly sectional view of the embodiment taken along line Y—Y of FIG. 1.

A transmission assembly according to the present invention is generally shown at 10. The assembly includes an input shaft 11 and a take-off shaft 12, both of which are journalled in a transmission element 13 of circular cross-section by bearings 14 and 15 respectively. The transmission element 13 conveniently forms a gear casing which in use is partly filled with a suitable lubricating oil. Conveniently, bearings 14 and 15 are annular contract bearings, the inner races of which are seated on their corresponding shafts and the outer races of which are respectively seated in sleeves or hubs 16 and 17 integral with the gear casing 13. The axes of the gear casing and shafts are co-axial. The driven shaft and take-off shaft are connected by a gearing arrangement rotatably journalled in the casing 13. The gearing arrangement includes four gears 18, 19, 20 and 21. Gears 18 and 21 are respectively keyed to the ends of the take-off shaft and input shaft 11 entering the casing. Gear 21 of the input shaft is in mesh with a gear 20 keyed to a stub shaft 22 journalled in the side of casing 13. A shaft 22 is conveniently carried by annular contact bearings 23. The axis of the shaft 22 is parallel to but offset from the axis of casing 13.

Gear 19 is keyed to a shaft 24 journalled in the casing each end of the shaft being carried by bearings 25 and 26 respectively. The axis of shaft 24 is angularly offset from shaft 22 and is positioned further away from the axis of casing 13 than shaft 22. Gear 19 is in mesh with gear 20 and 18.

The outer peripheries of sleeves 16 and 17 seat the inner races of bearings 28 and 29 respectively. The outer races of these bearings are carried in a frame 30 said frame for example being part of the chassis of a vehicle. Thus casing 13 may rotate relative to the safts 11 and 12. The transmission unit of the invention may be used to gear up or down the drive from an engine of motor. This may be done by varying the gear ratios of gears 18, 19, 20 and 21 such that when casing 13 is not rotating the take-off shaft rotates at a faster or a slower or the same speed as the input shaft 11.

Suitable means are provided for controlling the rate of rotation of the casing.

In one embodiment controlling means comprises a conventional hydraulic pump 40 which is driven by the rotating casing as shown in FIG. 3. The pump has an unloader valve 41 which opens when a predetermined pressure is reached inside the pump. When the valve is closed no fluid is allowed to escape and consequently the casing is prevented from rotating. Once the valve is opened and fluid is allowed to escape, the casing is permitted to rotate at a controlled rate. The rate at which the casing rotates may be controlled by regulating the flow of luid from the pump.

Other conventional methods of braking may be used, for example friction brake shoes, or a vacuum-servo unit.

The mode of operation of the above embodiment is as follows:- If the input shaft 11 is rotating at a constant speed and the casing is not restrained from rotating, as for example, when valve 41 is fully open, then the casing will acquire a rotational speed the same as that of the driven shaft. In such case, the take-off shaft will not rotate. If a braking restraint is applied to the casing, as for example when the flow of fluid from the pump is reduced, the rotational speed of the casing will decrease and the take-off shaft will consequently begin to rotate. As restraint on the casing is increased a corresponding increase in the rotational speed of the take-off shaft will occur. When the casing is prevented from rotating, as for example when valve 41 is closed, direct drive through the transmission unit will result.

Thus by using such an assembly it is possible to achieve an infinitely variable gearing down of the input shaft.

It is also envisaged that by a suitable choice of gearing ratios it is possible to 'gear up' the direct drive from an engine or motor.

When the assembly is to be connected to the drive of an engine or motor having an irreversible output, for example an internal combustion engine, it is possible to provide a reversing arrangement. The purpose of this arrangement is to make the gear casing rotate at a faster speed than the driven shaft. Such a reversing arrangement is shown by way of example in FIG. 3 and includes a gear 50 key to the input shaft 11. A gear 51 having fewer teeth than gear 50 is secured to the outside of casing 13. A slidable shaft 49 is provided carrying a gear 52 and a gear 53 keyed thereto. Shaft 49 and corresponding gears is slidable longitudinally to engage with gears 50 and 51. When gear 53 is in mesh with gear 50, and no restraint is applied to the casing, the casing is made to rotate at a greater speed than the input shaft and thus has the effect of reversing the direction of rotation of the take-off shaft.

It is also envisaged that an embodiment according to the invention may be adapted so that the casing is allowed to slip when a predetermined load is applied to the take-off shaft. Since the casing is allowed to slip loadings on the take-off shaft are not allowed to exceed the predetermined load and thus the driving motor or engine is not exposed to excessive load. This type of arrangement would be applicable for example to machine tool assemblies. This may be done by setting the unloader valve 41 to open when the predetermined loading on the take-off shaft has been reached.

In a further embodiment of the present invention there is provided a transmission unit including a clutch arrangement 100 for controlling the rate of rotation of the drum (FIG. 4).

Hub 17 is extended in the axial direction so as to form an elongated hub 17a. The end of hub 17a remote from casing 13 houses a bearing assembly 101 which supports take-off shaft 12.

Figure 5:
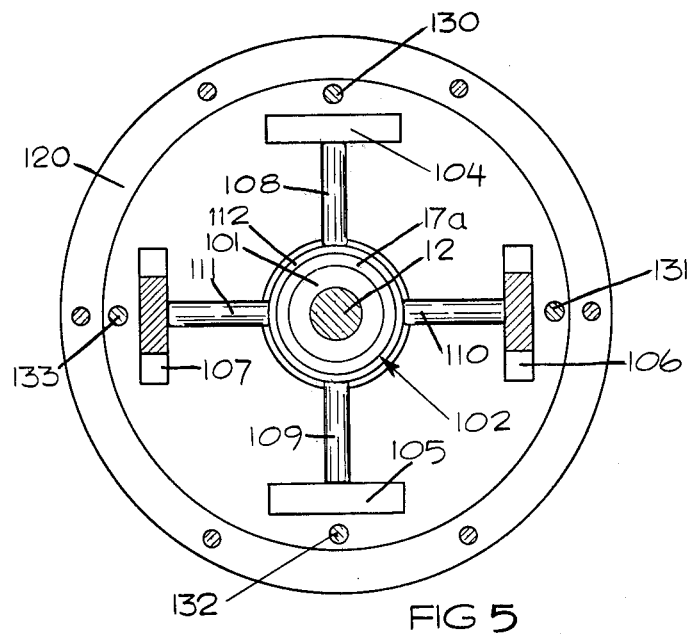
FIG. 5 is a cross-sectional view of the embodiment of FIG. 4 taken along line A—A.

Carried on the outer surface of hub 17a is a spider 102 having four wheels 104, 105, 106 and 107 (FIG. 5) rotatably mounted on shafts 108, 109, 110 and 111 respectively. The shafts are fixedly received in sleeve 112 which is keyed to hub 17a so as to be rotatable therewith.

Rotatably received on hub 17a and positioned between spider 102 and casing 13 is a plate 120. A bearing assembly 122 is located between plate 120 and hub 17a.

A similar plate 124 is rotatably mounted on take-off shaft 12. A bearing assembly 126 is located between shaft 12 and plate 124. Plates 120 and 124 are secured together by several bolts 190 (only two shown) so as to form a casing. The casing houses two opposed plates 180, 184 each having central apertures through which the hub 17a and the shaft 12 respectively pass. The plates 180, 184 are slidably mounted on shafts (not shown) extending from plate 120 to plate 124 in a direction parallel to the axis of shaft 12. The inner opposed faces 128, 129 of plates 180 and 184 respectively are provided with an annular layer of a suitable material, for instance an industrial brake lining material or preferably a resilient, deformable material 121, 123 respectively, for example an industrial rubber or elastomer.

Passing through each plate 180, 184 are four bolts 130, 131, 132 and 133. The bolts also pass through respective apertures formed in plate 124. Each bolt carries a nut 135 and interposed between the nut and plate 184 is a spring 136. Thus by tightening the bolts, plates 180 and 184 and urged towards one another and are consequently made to bear against wheels 104, 106 and 107. Shafts 110 and 111 are axially offset from shafts 108 and 109 such that material 121 carried on plate 180 is made to bear against wheels 104 and 105 only and material 123 carried on plate 184 is made to bear against wheels 106 and 107 only. The force with which the plates bear onto their associated wheels is determined by the tension in springs 136, this tension being varied by nuts 135.

Brake means are provided (not shown) which are operable to hold plates 180, 184 and prevent the same from rotating.

The operation of the transmission assembly including a clutch arrangement 100 is as follows. Subsequent to operation of the assembly, springs 136 are tensioned such that wheels 104, 105, 106 and 107 dig into their corresponding layers of material 121, 123 by a predetermined amount. The brake means are operated so as to lock plates 180, 184 into a non-rotatable condition. Thus for the spider to rotate relative to plates 180, 184, the respective wheels must deform the material co-operating therewith.

Take-off shaft 12 is loaded (e.g. the shaft 12 is connected to drive a ground engaging wheel of a vehicle) and the input shaft 11 is made to rotate.

Initially, if the torque in drive shaft 11 is insufficient to overcome the torque required to rotate shaft 12, the casing will begin to rotate (in the same direction as shaft 11) against the bias of clutch arrangement 100, as the clutch begins to slip.

Consequently, as the casing 13 begins to rotate, the torque developed in the take-off shaft 12 is increased.

The power developed in the input shaft is then progressively increased. In so doing, the casing 13 is made to rotate faster and the torque developed is take-off shaft 12 progressively increases. Once the torque being developed in the take-off shaft 12 is sufficient to overcome the torque required to rotate shaft 12, then shaft begins to rotate. As the power developed in the input shaft 11 increases further, the force developed for rotating the casing decreases and hence the casing is induced to slow down automatically because of clutch 100 and accordingly the rotational speed of take-off shaft 12 begins to increase. Once the torque developed in the driven shaft 11 is equal to the torque required in take-off shaft 12 casing 13 becomes stationary and a condition of direction drive prevails.

If the take-off shaft 12 suddenly stops e.g. some form of ceasure has occured, then the torque required to rotate the shaft would be extremely large. Accordingly, the difference between the torque being developed in the input shaft 11 and the torque required to rotate shaft 12 would be extremely large and in consequence the clutch 100 immediately begins to slip in an attempt to increase the torque being developed in the take-off shaft. The casing would rotate at the same speed as the driven shaft and thus give a pseudo neutral condition. The speed of rotation of input shaft 11 would therefore be unaffected by the sudden ceasure of the take-off shaft 12 and consequently no strain is put onto the engine or motor driving shaft 11.

A neutral condition is achieved in a similar manner to that described in the aforementioned embodiment wherein the casing 13 is allowed to rotate without any restraint. This is achieved in this embodiment by operating the braking means co-operating with said plates 180, 184 to release said plates and allow them to rotate with the spider 102. There is thus no restraint on the casing 13.

Reverse drive is preferably achieved in a conventional manner. For instance, the take-off shaft 12 can be connected to a simple gear assembly which when engaged reverses the direction of travel of the shaft 12. The above described clutch has been found to have a distinct advantage over conventional slip clutches since the clutch does not exhibit any tendency to heat up even when being used for long periods of.

In yet another embodiment of the invention the rotation of casing 13 is controlled by the provision of a further gearing arrangement 200 which is connected to the transmission assembly 10 as shown in FIG. 6. The gear casing generally shown at 113 is in two parts 13, and 13a. Interposed between the two parts 13, 13a, is a plate 210 to effectively form two gear chambers 201 and 202. The plate 210 rotatably supports shaft 12 which forms an intermediate shaft between the two assemblies. Keyed to one end of shaft 12 is gear 18 which is located in chamber 201 and keyed to the other end of shaft 12 is gear 221 which is located in chamber 202. A bearing assembly 225 is located between plate 210 and shaft 12.

Four through bolts 260 (only two shown) are used to secure casing parts 13 and 13a together.

The shaft 12 thus forms the take-off shaft for assembly 10 and the input shaft for assembly 200.

As shown in FIG. 6, gear 221 is in driving connection with the final take-off shaft 212 via a transmission gearing arrangement 200 which is identical to that of assembly 10. This transmission gearing arrangement includes gears 220, 219 and 218.

As shown in FIG. 6, the shafts 230, 231, 232 and 233 on which gears 19, 20, 219 and 220 are respectively carried extend the whole length of the combined assembly and protrude beyond end walls 9 and 209. By this provision, the through bolts are supplemented and thus the assembly is further rigidified.

The gearing arrangement in chamber 201 is such that when the casing 213 is stationary, the shaft 12 is made to rotate at the same speed as driving shaft 11. The gearing arrangement located in chamber 202 is such that the casing 213 is stationary, shaft 212 is driven at a slower speed than shaft 12, for example gear 221 has fewer teeth than gear 218. Thus the input speed for the further gearing arrangement 200 is slower than that for the first gearing arrangement. The difference in ratios between the gearing arrangements is preferably not less than 2%.

The operation of the embodiment illustrated in FIG. 6 is described below.

Initially the take-off shaft is stationary and is loaded. The motor or engine is then connected to the input shaft 11 via a conventional clutch (not shown) and is of sufficient power to slowly rotate the shaft 212 and to cause the casing to rotate in the same direction as input shaft 11.

The gearing arrangement 200 opposes the motion of the casing but due to the fact that the ratio of the gearing arrangement of chamber 201 is higher than that of gearing arrangement 200 the direction of rotation of casing 213 is in the direction of the predominent gearing arrangement of chamber 201.

The faster the rotation of casing 213, the greater the torque developed in the take-off shaft 212. The power of the engine is progressively increased and as a result the casing is made to rotate at a greater speed than the input shaft. Once the power difference between the power developed by the engine and transmission assembly and that required to turn shaft 212 starts to decrease, so does the speed of rotation of the casing. The speed of the casing then progressively decreases until it becomes the same as the input shaft whereat the internal gears become stationary and direct drive is achieved through the casing.

With this embodiment, it is not possible to obtain a neutral condition, and consequently a conventional clutch has to be employed as mentioned above. The clutch also enables the engine to develope enough power initially to rotate the assembly. Furthermore, it is not possible to obtain a reverse condition; to obtain this it is necessary to employ the use of a separate conventional gearing assembly to reverse the direction of rotation of the take-off shaft 212.

Figure 7:
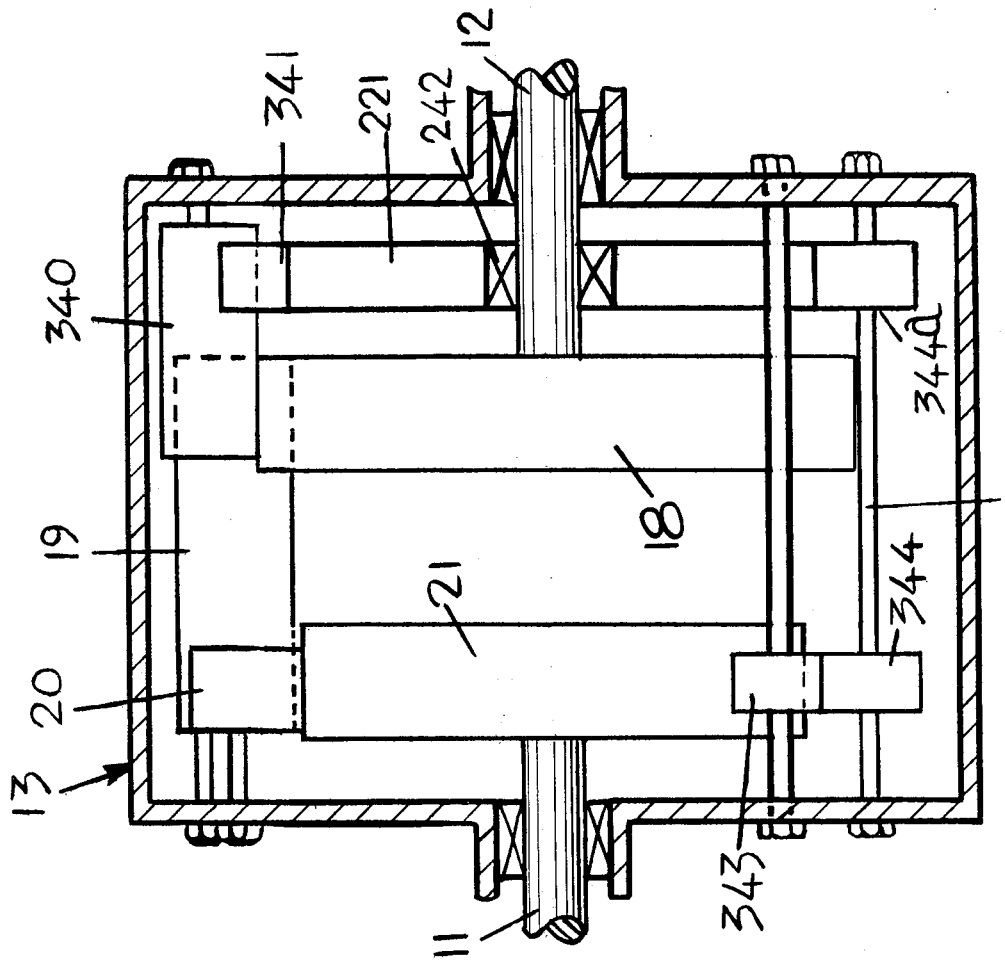
FIG. 7 is a sectional elevational view of an embodiment of the present invention which is a modification of the embodiment illustrated in FIG. 6.

With reference to FIG. 7 there is shown a modification of the embodiment of FIG. 6 wherein the further gearing assembly 200 is incorporated within casing 13. Connected to gear 18 is a pick up gear 340 which is connected via an idler gear 341 to gear 221 which is located adjacent gear 18 and is rotatably mounted on shaft 12. A bearing assembly 242 is located between gear 221 and shaft 12.

Gear 221 is connected to gear 21 via an idler gear 343 and pick-up gears 344 and 344a both of which are keyed to a shaft 345 which is rotatably journalled in casing 13.

The transmission assembly illustrated in FIG. 7 functions in a similar manner to that of FIG. 6 wherein the further gearing arrangement incorporated in casing 13 operates to oppose the motion of the casing which is induced by rotation of input shaft 11.

Thus, in use, when the input shaft 11 is driven the casing is induced to rotate and thus increase the torque being developed in the take-off shaft 12. When the power developed equals the torque required, the casing rotates at the same speed as the input shaft 11 and a condition of direct drive prevails as before.

As with the embodiment of FIG. 6, the transmission assembly requires a conventional clutch in order to obtain a neutral condition and also to develope enough torque in the input shaft 11 in the initial stages of operation.

Again conventional gearing can be used to obtain reverse drive.

The main advantage of the embodiments of FIGS. 6 and 7 is that the transmission assembly is compact and may be conveniently used, for example, to provide the gearing drive for a bicycle.

What is claimed is:

1. A transmission assembly, comprising:
   an input shaft;
   a take-off shaft in co-axial alignment with said input shaft;
   a first gear fixedly mounted on said input shaft and in co-axial alignment therewith;
   a second gear fixedly mounted on said take-off shaft and in co-axial alignment therewith;

a transmission element rotatably mounted on said input and take-off shafts;

at least one gearing arrangement rotatably carried by said transmission element, each at least one gearing arrangement meshing with said first and second gears;

restraining means for controlling the rate of rotation of said transmission element so as to regulate the speed of rotation of said take-off shaft;

wherein said restraining means comprises an additional gearing assembly including at least one further gearing arrangement rotatably mounted in said transmission element, the additional gearing assembly being adapted to develop a torque to approximate the rotation of the transmission element;

a third gear fixedly mounted on said take-off shaft in co-axial alignment therewith;

a fourth gear fixedly mounted on an output shaft in coaxial alignment therewith;

said transmission element being rotatably mounted on said input, take-off, and output shafts respectively; and each further gearing arrangement being similar to said at least one gearing arrangement and serving to provide a driving connection between said third and fourth gears.

2. A transmission assembly according to claim 1:

wherein the first gear and second gear are so relatively sized as to provide a geardown between said input and take-off shafts;

wherein said third gear and said fourth gear are so relatively sized as to provide a geardown between said take-off and output shafts; and wherein the amount of geardown between said input and take-off shafts is greater than the geardown between said take-off and output shafts.

3. A transmission assembly according to claim 1, wherein the additional gearing assembly comprises:

a fifth gear rotatably mounted on said take-off shaft in co-axial alignment with said second gear;

each additional gear arrangement including a first gear train providing a driving connection between said second gear and said first gear, and a second gear train providing a driving connection between said fifth gear and said first gear; and the first and second gear trains being adapted to oppose motion of said first gear to provide opposition to the rotation of said transmission element.

4. A transmission assembly according to claim 3, wherein said first gear is of smaller diameter than said fifth gear and said fifth gear is of smaller diameter than said second gear.

5. A transmission assembly according to claim 4, wherein said transmission element defines a casing for said gears.

6. A transmission assembly according to claim 2, wherein said transmission element defines a casing for said gears.

* * * * *